Figures 1, 2:
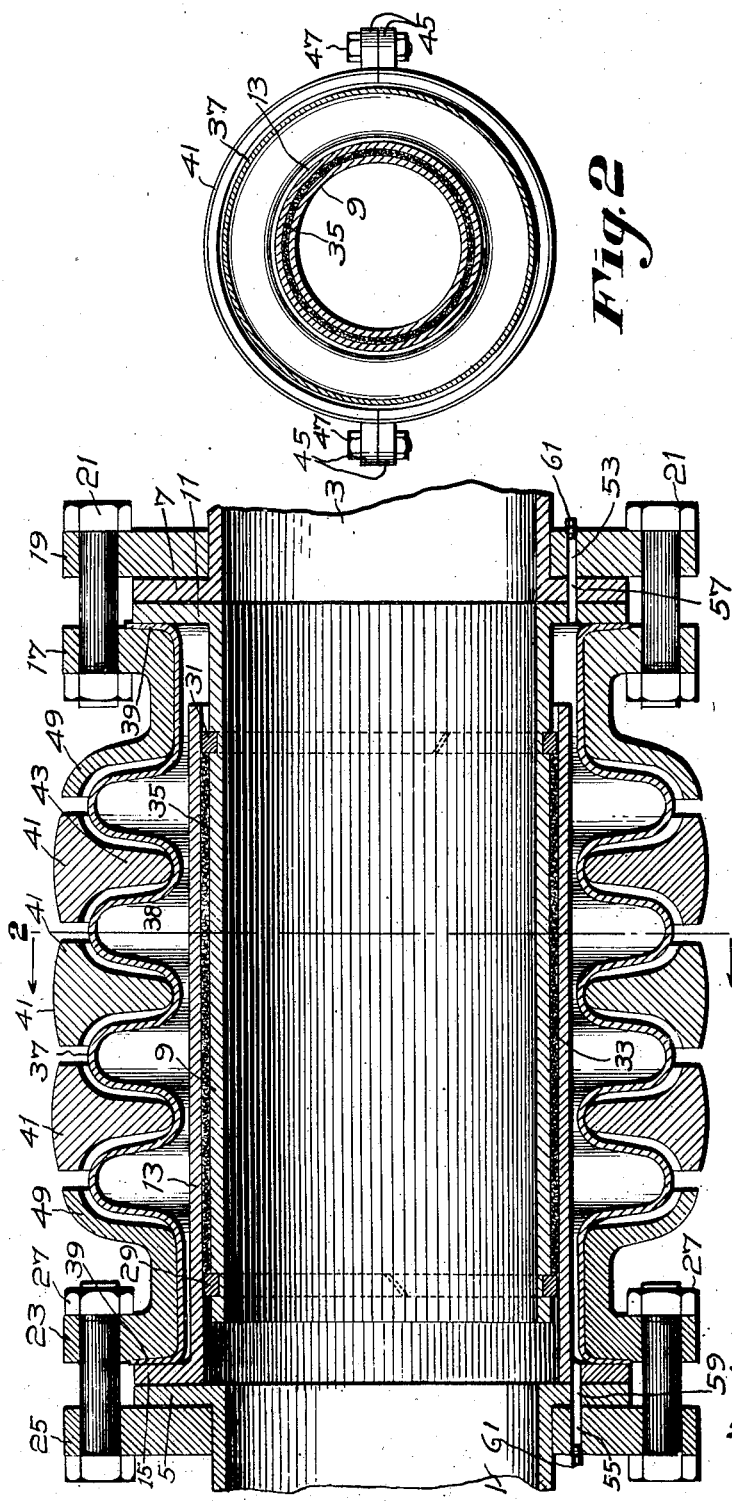

Aug. 19, 1924.

H. ALLPORT

EXPANSION JOINT

Filed June 6, 1921

1,505,121

Inventor:
Hamilton Allport
by Rob't F. Harris
Attorney

Patented Aug. 19, 1924.

1,505,121

UNITED STATES PATENT OFFICE.

HAMILTON ALLPORT, OF READING, PENNSYLVANIA.

EXPANSION JOINT.

Application filed June 6, 1921. Serial No. 475,264.

*To all whom it may concern:*

Be it known that I, HAMILTON ALLPORT, a citizen of the United States, residing at Reading, in the county of Middlesex and State of Massachusetts, have invented an Improvement in Expansion Joints, of which the following description, in connection with the accompanying drawings, is a specification, like characters on the drawings representing like parts.

The invention to be hereinafter described, relates to expansion joints for superheated steam and other service.

All piping layouts involving possible temperature changes should be provided with means for taking up expansion and contraction in the fluid distributing system. The present extensive employment of superheated steam in particular, has been accompanied by the necessity of providing suitable means to care for the pipe expansion produced by the superheated steam. Usually this expansion is taken care of by bends or offsets in the pipe line, or by expansion joints of the ordinary bellows or so-called slip type, both of which present numerous difficulties and objections.

Bends and offsets in the pipe line are awkward and bulky. When the piping extends horizontally, there is a tendency to spring the ends thereof horizontally, and when the piping extends vertically, there is always a tendency to induce vertical distortion. In the vertical installation, an objectionable laterally offset pocket is formed in the line. In both the horizontal and vertical installations, the pipe bends or offsets make it impossible to secure a straight passageway through the piping. The pipe bends or offsets offer substantial resistance to compression or flexion. Since the force required to compress is a measure of the stresses induced in the pipe line, in the fittings and in the communicating equipment, the liability of distortion or fracture is greater than in a construction which is more readily compressed or flexed than the pipe bend or offset. In large pipe installations, a relatively great length of bend or bends is required to take up normal expansion in the line. This may necessitate the use of a bend formed of more than one length of pipe requiring one or more flanged joints in the bend, and objectionably increasing the bulk of the installation. Bends of a single length of pipe are usually limited to pipe lines 6″ in diameter or less. Multiple branch bends aim to obviate this limitation, but still further increase the bulk and joints by their headers and multiple bends.

Expansion joints of the bellows type are usually constructed of copper because of the flexibility of this metal, but copper is adversely affected by superheated steam, crude oil containing sulphur, and by other fluids of a corrosive nature, and copper expansion joints are therefore limited in use to systems handling saturated steam and other relatively inert fluids. Furthermore the copper bellows lack stiffness and the possible length of the bellows is restricted. Joints employing bellows formed from ferrous and the other less flexible metals are stiff, and are apt to crystallize under the repeated expansion and contraction.

Expansion joints of the usual design of slip type are dependent upon stuffing boxes and packing. The latter deteriorates under the direct action of superheated steam, so that leaks and blow-outs are liable to result therefrom. This packing is subjected to full steam pressure on one side and atmospheric pressure on the other side. This substantial differential pressure renders leaks and blow-outs not unusual. The consequence is that adjustments and replacements are frequently demanded, and repacking necessitates shutdowns. These slip joints are difficult to guide properly, and are liable to bind, stick and buckle.

The expansion joint of the present invention aims to overcome the aforesaid and other objections.

The character of the invention will be best understood by reference to the following description of one good form thereof shown in the accompanying drawing, wherein:

Fig. 1 is a longitudinal section through an expansion joint embodying the invention; and Fig. 2 on a reduced scale is a transverse section taken on line 2—2 of Fig. 1.

Referring to the drawing, the expansion joint shown therein as one good form of the invention, comprises pipes, ports or shells 1 and 3 of a pipe line having end flanges 5 and 7 respectively.

Interposed between these end flanges is an inner sleeve 9 having a flange 11, and an outer sleeve 13 having a flange 15. These sleeves 9 and 13 which are preferably of ferrous or composition material, telescope or overlap a substantial distance.

The pipe flange 7 and the sleeve flange 11 may be securely held between companion flanges 17 and 19 connected by a series of bolts 21. The pipe flange 5 and sleeve flange 15 may be securely held between companion flanges 23 and 25 connected by a series of bolts 27. Interposed between the sleeves are rings 29 and 31 of Monel metal or other suitable material. These rings, in the present instance, are seated in circumferential grooves in the inner sleeve but may be secured to a sleeve by other means, and preferably are spaced widely apart to furnish desirable guidance and stiffness, as more fully hereinafter described. These rings are not in tight engagement with the sleeves, or at least with one of them, in order to permit one sleeve to slide within the other, and seepage of fluid from the interior of the piping through the passage 33 is contemplated, as is also seepage at times in the opposite direction.

The annular passage or chamber 33 bounded by the sleeves and the rings, may be filled with a durable metallic graphoasbestos lagging 35, or other heat retarding substance, desirably of square rope form. This lagging does not serve as a packing or as a part of a stuffing box. It is not compressed and does not require attention or renewal. It is introduced to assist as a heat retardant. It will be understood, however, that this lagging is not indispensable, since the expansion joint will function with this lagging omitted.

The joint may be provided with a suitable expansion device or member, in the present instance, in the form of a yielding corrugated container or bellows 37 of copper or other suitable material, or other suitable means may be provided confining the fluid that seeps through the passage 33. The bellows may have out-turned flanges 39 interposed between the sleeve flanges 11 and 15 and held by the companion flanges referred to. Preferably the inner diameter of this bellows is somewhat larger than the outside diameter of the outer sleeve 13, so as to leave a chamber 38 between them.

Suitable means may be provided to limit the flexion or distortion of the corrugations of the bellows. In the present instance, this means comprises split expansion rings 41 having internal ribs 43 occupying the spaces between the corrugations. The parts of each ring may have ears 45 (Fig. 2) projecting therefrom detachably secured together by bolts 47 to facilitate assembly and removal of the rings as desired. The flanges 17 and 23 referred to, may have curved flanges 49 for co-operation with the end corrugations of the bellows. These rings however are not essential and may be omitted in some cases.

While in the present instance for purposes of illustration, the bellows is shown as provided with four corrugations, it will be understood that one or more corrugations may be employed according to conditions as required. In case merely one corrugation is used, the curved flanges 49 will furnish sufficient support for the single corrugation.

The expansion joint described functions desirably and efficiently for superheated steam service. Upon introduction of superheated steam to the pipe line, seepage thereof occurs through the intermediate passage 33 past the rings 29 and 31, and lagging 35, if the latter be employed, and gradually builds up the same pressure within the dead chamber 38 formed between the outer sleeve and the bellows, as exists in the pipe line. Expansion in the line causes relative sliding of the sleeves, increasing their overlap and causing flexion of the corrugations of the bellows 37.

It is a well known fact that superheated steam has a deleterious effect on copper and on packing, but the steam occupying the dead chamber 38 is in saturated and not superheated condition, since more heat is radiated from this dead chamber than is radiated to it by the superheated steam in the pipe line. This is due to the following conditions:

(1.) The temperature differential between the saturated or dead chamber, and the outside atmosphere is greater than the temperature differential between the dead chamber and the interior of the piping under usual working conditions.

(2.) The copper bellows is more efficient as a heat conductor than are the ferrous sleeves, and heat to reach the copper bellows must pass through the two ferrous sleeves of substantial thickness, through the lagging and through the saturated steam or dead chamber, whereas, heat radiated to the outside atmosphere, passes only through the copper bellows which is well ventilated by the spaces between the corrugations of the bellows and the equalizing rings.

(3.) The surface area of the bellows exposed to the atmosphere is materially greater than the surface area of the sleeves exposed to superheated steam. This is not only due to the greater length of the bellows occasioned by the corrugations, but also because of the greater diameter of the corrugations.

(4.) After the saturated steam chamber is filled with saturated steam, there is no flow of superheated steam from the piping to said chamber, as the latter is a dead end with no outlet to render flow possible. Therefore, conduction of heat by the superheated steam to said chamber does not exist.

There are many advantages in the expansion joint described. The bellows or other equivalent pressure retaining element is protected from contact with superheated steam or other fluid under distribution, and if the bellows or element is made of copper, the superheated steam cannot come in contact with and have deleterious effect thereon. Also, the superheated steam or other fluid being out of contact with the bellows or other pressure retaining element, cannot have erosive action thereon.

The fluid passes directly through the piping and the sleeves which are in effect straight continuations of the piping, and therefore, there are no bends, turns or offsets transverse to the direction of flow, so as to be exposed to wear by the fluid, which in many instances is at high velocities. There are no irregularities to induce eddy currents or friction loss other than the slight offset between the end of the inner sleeve and the pipe 1, but this offset is negligible and without material effect, and practically disappears when the pipes are expanded.

The expansion joint is efficiently guided and stiffened by the telescoping sleeves and the rings, the latter being widely separated so as to obviate possibility of jamming, and serve as sliding bearings for the sleeves in addition to their function of retaining the fluid pervious material in place.

The rings and lagging in the passage 35 intermediate the sleeves, so check or restrict the flow of fluid through said passage, that in event of failure or rupture of the copper bellows or other fluid confining means, the amount of steam escaping from the joint is comparatively slight and gradual, thereby furnishing a desirable feature of safety and reducing the liability of disaster to a minimum. The intermediate passage construction also desirably protects the copper bellows from sudden high pressures due to surging or hammer in the line.

It is difficult or impracticable to insulate bends, offsets and expansion joints as heretofore constructed, but by the present expansion joint, an internal insulated joint is provided, furnishing a proper heat insulation with consequent material reduction in radiation losses through the joint.

In some installations a slight modification of the construction described may be used. The flanges 19 and 25 may have tapped ports 53 and 55 therein respectively registering with ports 57 and 59 in the pipe and sleeve flanges. A small pipe may be connected with the tapped port 53, and conduct steam or other fluid from the main pipe line or other source into the saturated chamber 38. This small pipe may be exposed so that sufficient heat is radiated therefrom to reduce the steam to saturation temperature. In this condition it is admitted into the chamber 38.

A pipe may be connected to the tapped hole 55, and conduct the steam or other fluid to the next expansion joint in the line, and eventually deliver the same to a feed water heater, hot well or other destination. The steam passing through these small pipes and the saturated steam chamber may be regulated so as to pass but a slight amount of steam and maintain it at the same pressure as in the main pipe line. Expansion in this small pipe line is taken care of by the expansion joint or joints which it serves.

If the small pipe line is not used, the tapped holes 53 may be closed by suitable plugs 61. These plugs, or one of them, may be removed if desired, to permit taking temperature and pressure readings showing the condition of the steam in the saturated steam or dead chamber. This may be accomplished without piercing the copper bellows. The data thus obtained may be particularly useful in experimentation with this joint.

The expansion joint of the present invention, possesses advantages and refinements which recommend its use not only in superheated steam installations, but also in instances where it is desired to conduct other fluid or perform other functions.

In the embodiment of the invention illustrated the sleeves 9 and 13 are shown as secured to the pipes 1 and 3 respectively, but in some cases it may be desirable to so arrange the parts that one of the pipes to be connected will form one of the cooperating sleeves.

It will be understood that the invention is not limited to the specific embodiment shown, and that various deviations may be made therefrom without departing from the spirit and scope of the appended claims.

What is claimed is:—

1. In an expansion joint for superheated steam and other service, the combination of a pair of pipes, telescoping sleeves secured to said pipes respectively and spaced apart to leave a passage between said sleeves, guiding rings interposed between said sleeves, and an expansible member having heads secured to said pipes and formed to provide a de-superheated steam containing chamber around said sleeves.

2. In an expansion joint, the combination of a pair of pipes having telescoping sleeves, one substantially larger than the other to provide a passage between them, means to guide said sleeves on relative telescoping movement thereof, fluid pervious material confined in a non-compressed condition between said sleeves to obstruct the passage of heat by radiation and an expansible container surrounding said sleeves and connected to said pipes and adapted to receive fluid seeping from said pipes through said passage into said container.

3. In an expansion joint, the combination of a pair of pipes of a pipe line, an expansible bellows having ends secured to said pipes, a pair of telescoping sleeves secured to said pipes respectively, said bellows being expansible and said sleeves having telescoping relative movement on expansion of the pipe line, and widely spaced rings between said sleeves for stiffening and guiding the same in their telescoping movement.

4. An expansion compensating device for connecting pipes or shells of a pipe line for superheated steam, comprising in combination, a copper bellows connecting said pipes or shells, an inner relatively tight casing having overlapping parts, and heat insulating material confined between said parts to prevent steam in a superheated condition from coming in contact with the copper bellows.

5. In an expansion joint for superheated steam and other service, the combination of a pair of pipes, a copper bellows connecting said pipes, a pair of telescoping sleeves connected to said pipes respectively and spaced to provide a passage between them, spaced guides and heat retarding material in said passage and adapted to prevent superheated steam in the pipe line from coming in contact with the copper bellows.

6. In an expansion joint for superheated steam and other service, the combination of a pair of pipes, a pair of telescoping sleeves connected to said pipes respectively and spaced to provide a passage between them, guiding rings between said sleeves, heat retardant means in said passage between said rings, and an expansible member connected to said pipes and substantially larger than said sleeves to provide a chamber surrounding the latter.

7. In an expansion joint, the combination of a pair of pipes of a pipe line, a pair of telescoping sleeves connected to said pipes respectively and spaced to provide a passage between them, guiding means interposed between said sleeves having provision to allow fluid to seep from the piping through said passage, and an expansible container surrounding said sleeves and having a chamber for receiving the fluid seeping through said passage, the outer surface of said container being exposed to the atmosphere.

8. In an expansion joint, the combination of a pair of pipes of a pipe line, an expansible container connected to said pipes, and extensible means connected to said pipes within said expansible container and having a passage between the extensible means containing fluid pervious material in a confined but non-compressed condition to obstruct the flow of fluid thru the passage while permitting seepage therethru from the pipe line into said container, that the same pressure may be built up in said container externally of said extensible means as exists within the latter.

9. In an expansion joint, the combination of a pair of pipes of a pipe line, telescoping sleeves secured to said pipes respectively and having spaced bearing surfaces between the sleeves to guide the sliding movement of the sleeves, an expansible container forming a chamber surrounding said sleeves, and means adapted to admit fluid into and out of said inner chamber thru a tapped wall.

10. In an expansion joint, the combination of a pair of pipes of a pipe line, a pair of telescoping sleeves, means including flanges for securing one of said sleeves to one of said pipes, and the other sleeve to the other pipe, an expansible container surrounding said sleeves, said sleeves and container forming a chamber therebetween, said flanges having ports therethrough adapted to allow a fluid to pass into said chamber and out of the same.

11. In an expansion joint, the combination of a pair of pipes of a pipe line, ferrous sleeves having ends secured to said pipes respectively, said sleeves being spaced apart and overlapped a substantial distance to form a passage between them, Monel metal rings interposed between said sleeves for guiding the same in relative longitudinal movement, and a copper container forming a chamber surrounding said sleeves and having ends connected to said pipes.

12. In an expansion joint, the combination of a pair of ports of a pipe line, relatively long overlapping parts forming extensible fluid conducting means between said ports, a fluid tight expansible chamber surrounding said overlapping parts and cooperating therewith to form a chamber for containing fluid under the same pressure as exists in the pipe, and pervious material confined between the overlapping parts to retard the passage of heat from the interior of the expansion joint by radiation.

13. In an expansion joint, the combination of a pair of pipes of a pipe line, an expansible container connected to said pipes and adapted to accommodate expansion or contraction of the pipe line, and porous heat insulation material supported in spaced relation to said chamber to separate the container from the fluid flowing through the pipe line.

14. An expansion joint for connecting pipes or shells of a pipe line, comprising in combination, a pair of telescoping sleeves connected to the pipes or shells and constructed to form an annular space between the sleeves, heat insulating material within the annular space to reduce the loss of heat by radiation, and spaced shoulders upon one of the sleeves for confining the material lengthwise.

15. An expansion compensating device for connecting pipes or shells of a pipe line, comprising in combination, an outer fluid tight container secured to said pipes, an inner relatively tight container secured to said pipes, and porous material supported in a non-compressed condition by the inner container to form a heat confining jacket for the inner container and adapted to restrict the escape of fluid in event of failure of the outer container.

16. An expansion compensating device for connecting pipes or shells of a pipe line, comprising in combination, an outer fluid tight container secured to said pipes to confine fluid about the inner container and formed to radiate heat rapidly, an inner relatively tight container provided with heat insulating material thru which fluid may pass to the outer container and forming a heat insulating wall adapted to retard the radiation of heat from the fluid within the pipe line to the outer container to promote a substantial drop in the temperature of the fluid within the outer chamber.

In testimony whereof, I have signed my name to this specification.

HAMILTON ALLPORT.